(12) United States Patent
Dieckmann et al.

(10) Patent No.: US 11,052,892 B2
(45) Date of Patent: Jul. 6, 2021

(54) ELECTRONICALLY CONTROLLABLE PNEUMATIC BRAKE SYSTEM IN A UTILITY VEHICLE AND METHOD FOR ELECTRONICALLY CONTROLLING A PNEUMATIC BRAKE SYSTEM

(71) Applicant: WABCO Europe BVBA, Brussels (BE)

(72) Inventors: Thomas Dieckmann, Pattensen (DE); Robert Otremba, Ronnenberg (DE); Oliver Wulf, Neustadt (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 314 days.

(21) Appl. No.: 16/095,942

(22) PCT Filed: Mar. 13, 2017

(86) PCT No.: PCT/EP2017/000326
§ 371 (c)(1),
(2) Date: Oct. 24, 2018

(87) PCT Pub. No.: WO2017/190820
PCT Pub. Date: Nov. 9, 2017

(65) Prior Publication Data
US 2019/0152459 A1 May 23, 2019

(30) Foreign Application Priority Data
May 2, 2016 (DE) .......................... 102016005318.6

(51) Int. Cl.
*B60T 13/26* (2006.01)
*B60T 13/68* (2006.01)
(Continued)

(52) U.S. Cl.
CPC .......... *B60T 13/683* (2013.01); *B60T 13/662* (2013.01); *B60T 17/18* (2013.01); *B60T 2270/402* (2013.01)

(58) Field of Classification Search
CPC ..... B60T 13/662; B60T 13/665; B60T 13/683
(Continued)

(56) References Cited

U.S. PATENT DOCUMENTS 5,624,163 A 4/1997 Kiel et al.
6,659,244 B2 12/2003 Goodell
(Continued)

FOREIGN PATENT DOCUMENTS

DE 2818813 C3 3/1996
DE 19504394 C1 3/1996
(Continued)

*Primary Examiner* — Christopher P Schwartz
(74) *Attorney, Agent, or Firm* — Leydig, Voit & Mayer, Ltd.

(57) ABSTRACT

An electronically controllable pneumatic brake system. The brake system includes at least two brake circuits, wherein a first of the at least two brake circuits is allocated an electrically and pneumatically controllable control valve and a second of the at least two brake circuits is allocated an electrically controllable parking brake valve in order to predetermine braking pressures so as to actuate wheel brakes of the respective brake circuit. The brake system further includes a first control unit configured to electrically actuate the electrically and pneumatically controllable control valve in dependence upon a vehicle desired deceleration and a second control unit configured to electrically control the parking brake valve in dependence upon the vehicle desired deceleration that is requested in an automated manner. In addition, the brake system includes at least one bypass valve to which a control valve is allocated.

19 Claims, 6 Drawing Sheets

(51) Int. Cl.
*B60T 13/66* (2006.01)
*B60T 17/18* (2006.01)

(58) Field of Classification Search
USPC ........... 188/3 H, 3 R, 112 R; 303/9.61, 22.4, 303/115.2, 122, 122.04, 122.05, 122.09, 303/122.13, 127; 180/271
See application file for complete search history.

(56) References Cited

U.S. PATENT DOCUMENTS

| | | | |
|---|---|---|---|
| 7,520,572 B2 | 4/2009 | Hatipoglu et al. | |
| 7,866,761 B2* | 1/2011 | Gerum | B60T 8/321 |
| | | | 303/9.61 |
| 10,093,293 B2* | 10/2018 | Lulfing | B60T 8/94 |
| 10,501,062 B2* | 12/2019 | Wulf | B60T 8/94 |
| 10,730,499 B2 | 8/2020 | Otremba | |
| 10,730,500 B2* | 8/2020 | Schnittger | B60T 7/20 |
| 2006/0152075 A1 | 7/2006 | Goebels et al. | |
| 2010/0025141 A1* | 2/2010 | Bensch | B60T 8/327 |
| | | | 180/271 |
| 2011/0005874 A1* | 1/2011 | Beier | B60T 13/26 |
| | | | 188/106 F |
| 2011/0012421 A1* | 1/2011 | Bensch | B60T 8/1708 |
| | | | 303/115.2 |
| 2013/0221735 A1 | 8/2013 | Kiel et al. | |
| 2015/0084402 A1 | 3/2015 | Tober et al. | |
| 2018/0362008 A1* | 12/2018 | Farres | B60T 13/588 |

FOREIGN PATENT DOCUMENTS

| | | |
|---|---|---|
| DE | 19750392 A1 | 5/1998 |
| DE | 19653264 A1 | 6/1998 |
| DE | 102010050578 A1 | 5/2012 |
| DE | 102013015949 A1 | 3/2015 |
| DE | 102014013882 A1 | 3/2015 |
| DE | 102014006615 A1 | 11/2015 |
| EP | 1530529 B1 | 5/2007 |
| EP | 1730006 B1 | 12/2012 |
| JP | 2010523384 A | 7/2010 |
| JP | 2018526273 A | 9/2018 |
| WO | WO 2017036569 A1 | 3/2017 |

* cited by examiner

ELECTRONICALLY CONTROLLABLE PNEUMATIC BRAKE SYSTEM IN A UTILITY VEHICLE AND METHOD FOR ELECTRONICALLY CONTROLLING A PNEUMATIC BRAKE SYSTEM

CROSS REFERENCE TO RELATED APPLICATIONS

This application is a U.S. National Stage Application under 35 U.S.C. § 371 of International Application No. PCT/EP2017/000326 filed on Mar. 13, 2017, and claims benefit to German Patent Application No. DE 10 2016 005 318.6 filed on May 2, 2016. The International Application was published in German on Nov. 9, 2017 as WO 2017/190820 A1 under PCT Article 21(2).

FIELD

The invention relates to an electronically controllable brake system in a commercial vehicle, in particular in a commercial vehicle that may be controlled in an automated manner, and also a method for electronically controlling a pneumatic brake system.

BACKGROUND

In vehicles, in particular commercial vehicles, having a pneumatic brake system, in particular configured as an electronic service brake system (EBS or ABS), it is possible in order to output braking pressures in a controlled manner using a control unit (ECU) to actuate electronic control valves, by way of example relay valves or axle modulators, which relay a braking pressure pneumatically to the brake cylinders of operating brakes of the brake system in dependence upon a vehicle desired deceleration that is requested. The procedure of outputting a braking pressure in a controlled manner is superimposed on the pneumatic braking pressure that is electronically output in a controlled manner in dependence upon an actuation of a braking force regulator or brake encoder via a brake pedal by the driver with the result that in a vehicle that is controlled in an automated manner the driver may also perform a further emergency braking procedure himself in the event of an emergency and/or that said driver may override the braking pressure that has been electronically output in a controlled manner.

In the case of hitherto solutions in known vehicles, in particular commercial vehicles that are controlled in an automated manner, having pneumatic brake systems, it is disadvantageous that in the event of a failure of the electronic actuation of the control valves a fallback level that may be controlled electronically is not present. The pneumatic fallback level of a conventional brake system then only functions if the driver also actuates the brake pedal. A further secondary brake system in the vehicle, by way of example a parking brake system, is likewise only active if the driver intervenes in order to further brake the vehicle. However, this is generally not the case in the case of a vehicle that is controlled in an automated manner, in particular if a driver is not sitting in the vehicle or in the driving seat or the driver is not paying attention or is occupied with other things.

DE 197 50 392 A1 illustrates a brake controller for a rear axle having a relay valve as a control valve, an electronically controlled proportioning valve and a pneumatic braking force regulator. The proportioning valve and the braking force regulator are connected via pneumatic control inputs to the relay valve and transmit a determined control pressure to the control input of the relay valve. The relay valve in turn outputs in a controlled manner the greater of the two control pressures proportionally as a braking pressure to the brake cylinder of the service brakes of the rear axle. Furthermore, a brake valve is provided, whose position is dependent upon the brake pedal actuation by the driver and which predetermines the braking pressure that is to be output by the relay valve in a controlled manner. For this purpose, a brake valve control pressure is pneumatically transmitted from the brake valve to the braking force regulator and simultaneously is electrically transmitted to the proportioning valve via a control signal via a control electronics system that then outputs a corresponding control pressure to the relay valve in a controlled manner, wherein when functioning properly the control pressure of the braking force regulator is set slightly lower than the control pressure of the electronically controlled proportioning valve. In the case of an electrical failure, a fallback level is configured as a consequence since if the electronically controlled proportioning valve fails or comprises a fault, the control pressure that is predetermined by the braking force regulator is automatically greater and is consequently used so as to output braking pressure in a controlled manner by means of the relay valve.

DE 28 18 813 C3 discloses an arrangement for preventing wheel spin. In the case of the arrangement being activated, a solenoid valve is opened that releases the working pressure from a pressure storage container with the result that said working pressure may be output in a controlled manner via a directional control valve to the solenoid regulating valves at the rear wheels. The solenoid valve is actuated by a comparison device in such a manner that in the case of wheel spin of the rear wheels when setting off, the rear wheels are braked via the solenoid regulating valves and as a consequence the speed of the rear wheels is adjusted to the speed of the front wheels. If a braking procedure is simultaneously introduced, the directional control valve is switched in such a manner that braking pressure is only supplied from the brake valve to the solenoid regulating valves and furthermore the wheels are braked.

DE 10 2014 013 882 discloses a method for ascertaining an unintentional pneumatic activation of a relay valve, wherein the relay valve is provided so as to actuate the service brakes and both requests from a brake valve as well as requests from a control procedure or regulating procedure are received for the automatic braking procedure.

U.S. Pat. No. 7,520,572 B2 and EP 1 730 006 B1 disclose a method in which the brake valve may be actuated in addition to the brake pedal by an electronic control unit. Accordingly, an electronic brake system is provided, its service brakes being actuated by means of the brake valve and via an additional relay valve. The braking request may be predetermined on the one hand via the brake pedal to the brake valve or however independently thereof via a brake valve actuator that is arranged between the brake pedal and the brake valve. The brake valve actuator is controlled by means of the electronic control unit in that if a control signal for braking the vehicle is present, a regulating pressure is output in a controlled manner to the brake valve actuator that is by way of example provided as a pneumatic valve with the result that the brake valve is actuated.

U.S. Pat. No. 6,659,244 B2 discloses a possible brake valve actuator for U.S. Pat. No. 7,520,572 B2 or EP 1 730 006 B1, which is arranged between the brake pedal and the brake valve and is configured as a pneumatic actuator having a piston. In the case of a control pressure from the electronic control unit being present, the pneumatic actuator retains the piston rod of the brake valve in the actuated position of said piston rod, independently of the position of the brake pedal in order by way of example to be able to configure a pre-trip functionality when the vehicle is at a standstill.

EP 1 530 529 B1 discloses a pressure regulating module for a compressed air brake system of a vehicle. It is provided that a relay valve that controls the service brake is actuated via a directional control valve, wherein the actuating procedure is performed by an ABS control unit in dependence upon a brake slip. Furthermore, it is provided to use an arrangement of this type in a traction control system in that a further directional control valve is connected upstream, said directional control valve connecting the compressed air connection of the directional control valve to a pressure storage container depending upon the presence of a loss of traction with the result that the pressure at the service brakes may also be increased via the relay valve.

DE 10 2010 050 578 A1 discloses a brake system in which a braking request is predetermined via a brake valve or a brake pedal device. This is converted in a control device into an electrical signal and using the electrical signal a control valve is actuated that outputs the braking pressure in a controlled manner to the service brakes. If the electronic system fails, in the redundancy case the control valve is pneumatically actuated via compressed air lines from the service brake valve and furthermore a braking pressure is output in a controlled manner to the service brakes. The control valve comprises multiple solenoid valves and also a relay valve. The solenoid valves may increase, maintain or reduce the braking pressure that is output by the relay valve in a controlled manner to the service brakes depending upon the desired function via the control pressure in that the respective solenoid valve is energized.

DE 10 2013 015 949 A1 discloses a brake system for assisting with cornering, wherein it is provided to output a braking pressure in a controlled manner to service brakes of the brake system using an electronically controlled multi-directional valve, wherein a braking pressure is also output in a controlled manner if a braking request from a first brake valve as a brake encoder is not present. The multidirectional valve and the first brake valve are connected via a shuttle valve to a relay valve that outputs the braking pressure in a controlled manner to the service brakes. The shuttle valve only provides the greater of the two pressures from the first brake valve or the shuttle valve to the relay valve with the result that the electrical request of the multidirectional valve may be overridden by means of the first brake valve.

DE 10 2014 006 615 A1 discloses a pneumatic brake system having a service brake device that comprises a brake encoder for electrically outputting a braking request by way of example in dependence upon a brake pedal actuation. Furthermore, a parking brake device is provided that in particular may actuate the wheel brakes of the rear axle. The brake encoder of the service brake device is connected via a data line to the parking brake device with the result that in the case of an electrical defect in the service brake device, a braking procedure that is requested by the driver may also be performed via the parking brake device at the rear axle. As a consequence, a redundancy is configured. It is disadvantageous that the vehicle is only braked in the redundancy case using the parking brake at the rear axle with the result that an unfavorable braking force distribution and also a limited braking effect is provided.

SUMMARY

In an embodiment, the present invention provides an electronically controllable pneumatic brake system. The brake system includes at least two brake circuits, wherein a first of the at least two brake circuits is allocated an electrically and pneumatically controllable control valve and a second of the at least two brake circuits is allocated an electrically controllable parking brake valve in order to predetermine braking pressures so as to actuate wheel brakes of the respective brake circuit. The brake system further includes a first control unit configured to electrically actuate the electrically and pneumatically controllable control valve in dependence upon a vehicle desired deceleration that is requested in an automated manner or in dependence upon a driver-predetermined actuation via an actuating device and a second control unit configured to electrically control the parking brake valve in dependence upon the vehicle desired deceleration that is requested in an automated manner, if an electrical actuation of the respective control valve is prevented, so as to provide an electronically pneumatically controlled redundancy. In addition, the brake system includes at least one bypass valve to which a control valve is allocated, the bypass valve being configured to pneumatically actuate the allocated control valve, wherein the pneumatic actuation is performed in dependence upon the vehicle desired deceleration that is requested in an automated manner or in dependence upon the driver-predetermined actuation of the actuating device if an electrical actuation of the respective control valve is prevented, so as to enhance the electronically pneumatically controlled redundancy.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the invention provide electronically regulated actuation for a pneumatic brake system and also provide methods for electronically regulating a pneumatic brake system that ensure with little outlay a safe and reliable redundant braking procedure in particular in a vehicle that may be controlled in an automated manner.

In accordance with embodiments of the invention, it is provided to configure an electronic pneumatic fallback level or redundancy in an electronically controllable pneumatic brake system in which an automated driving procedure, in particular an automated braking procedure, is rendered possible by means of electronically predetermining a vehicle desired deceleration, in particular a negative acceleration, by virtue of the fact that in addition to a first control unit that electrically actuates at least one electrically and pneumatically controllable control valve that is allocated to a brake circuit, a second control unit is provided via which it is possible to electrically control a parking brake valve and to perform an electric and pneumatic actuation of the control valve, in particular in the redundancy case, via a bypass valve. The redundancy case occurs in particular if an electrical actuation of the control valve via the first control device is prevented.

The second control unit that is preferably integrated in the parking brake valve and overrides the control of said parking brake valve may for this purpose electrically control the parking brake valve via a parking brake signal in dependence upon the vehicle desired deceleration that is by way of example requested in an automated manner and said parking brake valve then accordingly pneumatically actuates the wheel brakes at a vehicle axle via a further independent brake circuit. It is possible via the bypass valve that is allocated to the control valve pneumatically to pneumatically actuate the control valve either in dependence upon a braking request that is predetermined by a driver by means of an actuation of an actuating device or in dependence upon a braking request that is electrically predetermined by the second control unit, in particular the vehicle desired deceleration.

As a consequence, it is already possible to achieve the advantage by virtue of the fact that by means of the second control unit an electronic pneumatic fallback level or redundancy may be configured in a vehicle in particular a commercial vehicle that is controlled by way of example in an automated manner and comprises an electronically controlled pneumatic brake system. Since for the case that the at least one control valve that is electronically actuated by the first control unit via the electrical control signal that is transmitted via at least one control valve data line, by way of example a CAN bus, may not be actuated by way of example owing to an electrical defect in the signal transmission, by way of example an error in the CAN bus, to the or from the first control unit, an electrical controlling procedure of the parking brake valve and also simultaneously of the bypass valve may be output via the second control unit in dependence upon the vehicle desired deceleration. As a consequence, the electronic pneumatic redundancy may be expanded by means of an additional actuation of the bypass valve.

Each control valve is allocated to a brake circuit of the vehicle and outputs braking pressures in a controlled manner in the respective brake circuit to the wheel brakes, wherein in the case of a pneumatic actuation of the control valve, a braking pressure is output in a controlled manner to the wheel brakes of the respective brake circuit in dependence upon a pneumatic control pressure and, in the case of an electronic actuation of the control valve, a braking pressure is output in a controlled manner to the wheel brakes of the respective brake circuit in dependence upon an electrical control signal.

It is not necessary to predetermine the control pressure for the control valve for each brake circuit via the bypass valve. By way of example, a bypass valve may be allocated to a first control valve of a front axle in a first brake circuit and it is possible not to allocate a bypass valve to a second control valve of a rear axle in a second brake circuit with the result that the second control valve may only be actuated by way of example by the first control device in an electrical manner and in accordance with a first embodiment may also be pneumatically actuated directly by the actuating device.

It is possible in the respective control valve via a corresponding integrated redundancy function to automatically switch from an electronic actuation to a pneumatic actuation with the result that the respective control valve in the redundancy case may no longer be controlled by means of the electrical control signals but rather may be controlled automatically by means of the control pressure that is output in a controlled manner by the allocated bypass valve or by the actuating device.

The actuating device may be configured in accordance with a first embodiment as a pneumatic actuating device, by way of example a pneumatic brake valve. The pneumatic brake valve is configured so as to output a brake valve control pressure to the bypass valve in dependence upon an actuation of the foot brake pedal. The second control unit may simultaneously, in particular in the redundancy case, output in an electrical manner a bypass signal to the bypass valve in dependence upon the automated predetermined vehicle desired deceleration. The bypass valve generates by means of a bypass electronic system internally a bypass control pressure that corresponds to the vehicle desired deceleration that is transmitted via the bypass signal.

In accordance with this embodiment the bypass valve that is allocated to the respective control valve comprises a select-high valve that selects the greater of the two prevailing control pressures, in other words either the bypass control pressure or the brake valve control pressure and outputs in a controlled manner the greater pressure to the control valve that is allocated to the bypass valve. The respective control valve may consequently predetermine a braking pressure, in particular in the redundancy case, which implements either the vehicle desired deceleration or the braking request that is predetermined by the driver.

If the driver also actuates the brake pedal in the redundancy case during a purely automated actuation of the wheel brakes in dependence upon the vehicle desired deceleration and the actuation is so intense that the brake valve control pressure is greater than the bypass control pressure, the bypass valve thus outputs in a controlled manner the in the case greater brake valve control pressure as a control pressure to the control valve; the automated braking procedure is consequently overwritten or overridden by the driver. The driver may therefore intervene in the braking procedure, by way of example during an emergency braking situation or if he notices that the redundant braking procedure is incorrect, by way of example is not sufficiently intense.

The bypass valve may already be integrated in the at least one control valve or in the pneumatic brake valve in order to advantageously render it possible to transmit pressure over short distances.

The parking brake valve that is controlled by the second control unit is connected directly to the wheel brakes in a further independent brake circuit, by way of example to the wheel brakes at a rear axle of the vehicle and—when provided—also of a trailer with the result that in the case of a deceleration request being made by means of the second control unit, a corresponding braking effect may be initiated by means of these wheel brakes. The deceleration request may likewise be predetermined in dependence upon the vehicle desired deceleration that is requested in an automated manner, a parking braking procedure that is requested in an automated manner but also by means of a parking brake function that is activated by the driver—when the vehicle is at a standstill or when the vehicle is being driven—, wherein the deceleration request then follows from a parking brake force that is requested by the driver or a parking braking procedure specification.

The wheel brakes of the rear axle and also of the trailer may comprise for this purpose by way of example combined service and spring-type brake cylinders with the result that a braking procedure may be implemented using the same wheel brake but in different brake circuits in the case therefore of using a parking brake function and a service brake function, said braking procedure being requested directly by the parking brake valve and/or by the pneumatic brake valve via a control valve, with or without an interconnected bypass valve.

Consequently, it is possible in accordance with embodiments of the invention to electrically pneumatically actuate wheel brakes of the brake system via the respective control valve either via a control signal that is predetermined in an electric manner by the first control unit or, in particular in the redundancy case, via the electrical parking brake signal or bypass signal that is predetermined by the second control unit and is implemented by the parking brake valve and by the bypass valve with the result that a braking procedure that is requested electronically may be implemented pneumatically in a different manner and consequently a braking procedure may be initiated in a reliable manner.

Whether a defect or a failure is present in the first control unit is established by way of example by the second control unit via a monitoring signal. If a defect or a failure is present, the vehicle desired deceleration that is predetermined in an automated manner is transmitted to the second control unit via a separate data line, by way of example via a separate CAN bus, from a third control unit, which is configured so as to assume the automated control of the vehicle and in particular to predetermine the vehicle desired deceleration, with the result that in the event of a failure of the first control unit it is possible to ensure that the vehicle desired deceleration is reliably transmitted to the second control unit.

The first control unit and the second control unit are arranged for this purpose in separate electrical circuits preferably having a respective energy supply with the result that in the case of a defect in one of the electrical circuits, the other electrical circuit is not impaired. The third control unit is supplied with energy by the two electrical circuits with the result that in the case of a failure of one electrical circuit the respective other electrical circuit may retrieve from the third control device the vehicle desired deceleration that is predetermined in an automated manner. Consequently, the braking procedure that is requested in an automated manner may be initiated so as to nevertheless achieve a vehicle desired deceleration via one of the electrical circuits. The control units may also be at least constructively combined.

It is consequently possible using electronic pneumatic brake systems in accordance with embodiments of the invention to advantageously configure multiple fallback levels or redundancies for an automated operation of the vehicle in the event of a failed electronic actuation of the control valves via the control signal:

A first fallback level or redundancy is accordingly provided by means of the mechanical actuation of the brake pedal by means of the driver pressing the brake pedal and in dependence thereupon the brake valve control pressure is pneumatically output in a controlled manner and the braking pressure that is proportional to the brake valve control pressure is output in a controlled manner from the respective control valve with or without a bypass valve connected upstream to the wheel brakes of the corresponding brake circuit, in other words a mechanical pneumatic redundancy is configured that may be activated in the automated operation of the vehicle in the redundancy case by the driver at any time.

If the driver is not paying attention or is occupied with other things or the vehicle is being driven in an automated manner without a driver or the driver is not in the driving seat, a second electronic pneumatic fallback level or redundancy is configured by means of the electrical actuation of the parking brake valve and of the bypass valve, said actuation being initiated by the second control unit, wherein said second electronic pneumatic fallback level or redundancy may be by way of example automatically activated in the automated operation of the vehicle if a problem is identified in the case of the electrical actuation of the control valves and the operation has not already fallen back to the first mechanical pneumatic redundancy.

In a vehicle that is controlled in an automated manner it is consequently possible in the redundancy case to fall back from a purely electronic actuation of the respective control valves to an electronic pneumatic actuation via the bypass valve and also the at least one control valve. Moreover, by means of the possibility of directly actuating the wheel brakes by means of the parking brake valve, a braking procedure is initiated that is otherwise achieved by means of a by way of example manual activation of the parking brake function by the driver.

As a consequence, costs may be advantageously saved since essentially components that are present in the vehicle are used for the redundancies. It is thus possible in vehicles in which an electropneumatic parking brake is already present in the vehicle to configure in a simple manner an electronic pneumatic redundancy, in particular in the automated operation of the vehicle, by means of an additional bypass valve and also a corresponding additional electronic actuation by means of the second control unit, by way of example having a corresponding software logic.

Moreover, a braking effect and also a braking force distribution to the vehicle axles may be optimized in the redundancy case by means of outputting a braking pressure in a controlled manner via the control valve in combination with the direct actuation of the wheel brakes by means of the parking brake valve with the result that a safe and reliable braking procedure of the commercial vehicle may be ensured.

In the event of a redundancy case not being present, both the pneumatic brake valve as well as the parking brake valve may be used in a conventional manner in the vehicle. The pneumatic brake valve may thus be mechanically actuated via the brake pedal in order to supply the wheel brakes with a braking pressure via the control valves with or without a bypass valve being connected upstream. In the same manner the conventional function of the parking brake may be implemented in that by way of example when the vehicle is being parked and in the case of an activated parking brake function the parking brake valve outputs a corresponding braking pressure in a controlled manner preferably to the wheel brakes of the rear axle and also—if present—to the brakes of a trailer. Furthermore, a parking brake procedure may also be performed in an automated manner by the third control unit when the vehicle is at a standstill or when the vehicle is being driven. Consequently, the conventional operation of the vehicle is advantageously not negatively influenced as a result of configuring the additional redundancy.

In accordance with a further embodiment, a purely electrical actuating device may be provided as an actuating device for the driver, said actuating device outputting a request signal in an electrical manner in particular to the second control unit in dependence upon the actuation by the driver. The request signal is converted in the second control unit into a driver deceleration and this driver deceleration is compared to the automated predetermined vehicle desired deceleration. The greater of the two decelerations is output via the bypass signal to the bypass valve. This generates a corresponding bypass control pressure and outputs this bypass control pressure in a controlled manner as a control pressure to the allocated control valve. Consequently, the select-high functionality is already implemented in the second control unit by way of example via software and the select-high valve may be omitted in the bypass valve. An actuation of the control valves in the vehicle is performed in accordance with this embodiment in a purely electrical manner when not in the redundancy case.

As a consequence, it may be possible to achieve the advantage that a braking request by the driver is no longer transmitted via pneumatic lines and the select-high functionality may moreover be provided via software. As a consequence, it may be possible to save costs and outlay. Moreover, the reliability of the brake system that may be actuated in a redundant manner increases by means of omitting pneumatic lines.

Consequently, in particular for the redundancy case, only at least one bypass valve is to be retrofitted with or without a select-high valve in a brake system having a parking brake and an intelligent software control with or without select-high functionality. For this purpose, it is preferred that a corresponding software may be upgraded on the second control unit that actuates the parking brake valve and the bypass valve, said software generating an electrical parking brake signal when a defect or a failure is identified in the electronic system of the first control unit and therefore actuating the parking brake valve and also transmitting a bypass signal to the bypass valve, said actuation of the parking brake valve and transmission of a bypass signal respectively being dependent upon the vehicle desired deceleration that is predetermined in an automated manner or in the second embodiment being dependent upon the driver deceleration. It is also possible using the software on the second control unit to monitor by way of example whether the wheels may also be locked and also the bypass valve or the parking brake valve may be monitored using the software on the second control unit with the result that in the redundancy case a safe and reliable control of the braking procedure may be achieved by the second control unit. However, the software may also be arranged in the bypass valve or however in the first or third control unit.

Consequently, using simple means and with little outlay it is possible to advantageously configure at least two fallback levels, an electric pneumatic and a mechanical pneumatic fallback level in an electronically controlled pneumatic brake system that is present.

The control valve is configured by way of example as a proportionally controlled relay valve having a 3/2 directional control valve or as an axle modulator, wherein the relay valve by way of example may be provided for a first brake circuit on the front axle and the axle modulator may be provided for a second brake circuit on the driven rear axle. The two control valves may be actuated both electrically (normal operation) as well as pneumatically (redundancy case), wherein an electronic system is provided in the respective control valve for the electrical actuation in order to convert the electrical specification via the control signal into a pressure that is to be output. Alternatively, axle modulators may also be provided on the two vehicle axles, for example a 1 channel axle modulator may be used on the front axle and a 2 channel axle modulator may be used on the rear axle. The two control valves render it possible, in particular in the redundancy case, to output a braking pressure in a controlled manner to the wheel brakes of the respective brake circuit, said braking pressure being in proportion to a prevailing control pressure that is output in a controlled manner by way of example from the respective bypass valve. Using this embodiment of the control valves, the pneumatic brake system may be configured by way of example as an EBS brake system.

If an electronically controllable pneumatic brake system is used with an antilock brake control, advantageously only relay valves that may be actuated electrically and pneumatically may be provided as control valves, by way of example having integrated, electrically controllable 3/2 directional control valves. Consequently, the redundancy may also be configured with the same advantages in a brake system with an antilock brake control in that in the case of a failure of the electronic actuation of the control valve the operation falls back to the pneumatic actuation of the control valve.

It is consequently possible using brake systems in accordance with embodiments of the invention in an electronically controlled pneumatic brake system with or without antilock brake control having respectively electronically actuated control valves in particular to configure an electric pneumatic and a mechanical pneumatic fallback level in order to supply the wheel brakes with a braking pressure and consequently in the case of an automated braking procedure also to be able to react in the case of a brake slip if the electronic actuation of the control valves via the first control unit fails. Where appropriate, further redundant sensors for identifying a brake slip may also then be provided in the vehicle.

The pneumatic brake systems in accordance with embodiments the invention may also be provided with more than two vehicle axles for actuating the wheel brakes, by way of example the brake system may be provided for a three-axle towing vehicle, wherein further brake circuits may be provided for the additional vehicle axles or the brake circuits that are present may also be used for the additional vehicle axles. Additional brake circuits may be actuated in the redundancy case in a corresponding manner by way of example via additional bypass valves.

Furthermore, trailer brake circuits in a trailer may also be electrically and pneumatically controlled in this manner, wherein the braking request may be transmitted electronically to the trailer by way of example via a trailer interface and pneumatically via an electropneumatic trailer control valve. A pneumatic trailer control pressure that is allocated to the trailer brake circuit may consequently be converted by trailer control valves into the corresponding braking pressures in order to also be able to initiate a braking procedure in the trailer brake circuit in the redundancy case. The control pressure for one of the brake circuits of the vehicle, preferably of the first brake circuit on the front axle may be used as a trailer control pressure. Alternatively, the trailer control pressure may also be predetermined independently of the other brake circuits.

Figure 1:
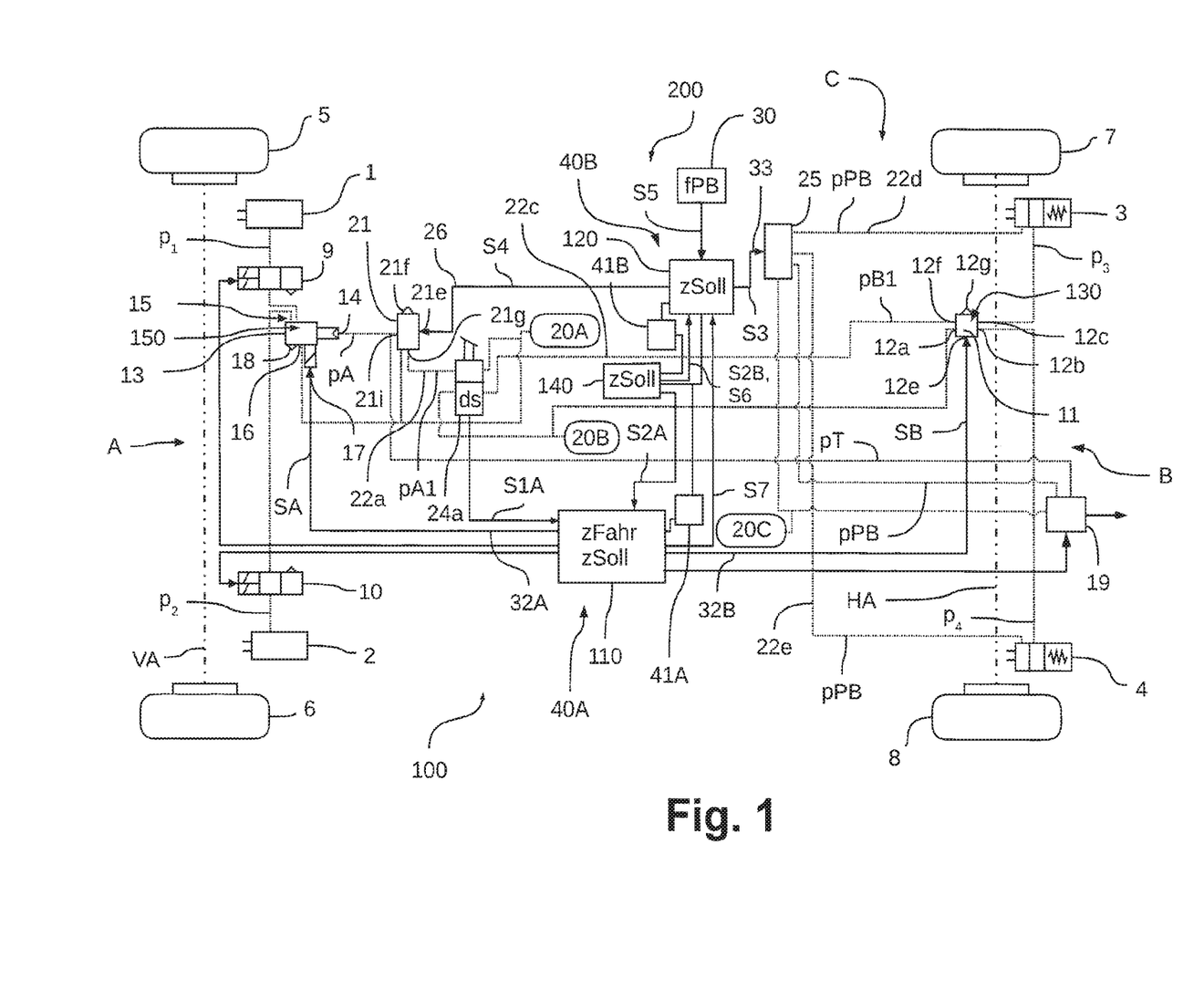
FIG. 1 illustrates a vehicle having an electronically controlled pneumatic brake system (EBS) as a block diagram.

The embodiment in accordance with FIG. 1 relates to a pneumatic EBS brake system 100 in a commercial vehicle 200, said brake system being electronically controlled, having wheel brakes 1, 2, 3, 4 at the wheels 5, 6, 7, 8. The wheel brakes 1, 2, 3, 4 are actuated in accordance with the illustrated embodiment in three brake circuits A, B, C, wherein a first brake circuit A relates to the wheel brakes 1, 2 at the wheels 5, 6 of a front axle VA and a second and a third brake circuit B, C relate to the wheel brakes 3, 4 at the wheels 7, 8 of a rear axle HA.

Conventional ABS brake valves 9, 10 are connected respectively upstream of the wheel brakes 1, 2 of the first brake circuit A on the wheels 5, 6 of the front axle VA so as to regulate a braking pressure p1, p2 in dependence upon an identified ABS brake slip. In accordance with this embodiment, in the second brake circuit B an axle modulator 11 is connected upstream of the wheel brakes 3, 4 on the driven wheels 7, 8 of the rear axle HA and said axle modulator may electronically and pneumatically regulate the braking pressure p3, p4 that is output in a controlled and known manner to the individual wheel brakes 3, 4 and likewise herein may take into account any brake slip at the rear wheels 7, 8.

The axle modulator 11 and also the ABS brake valves 9, 10 are electronically controlled via a first control unit 110 (ECU). However, separate control units for the axle modulator 11 and the ABS brake valves 9, 10 may also be provided, said control units individually actuating the respective valves 9, 10, 11.

The first brake circuit A comprises as a first control valve a relay valve 13 that comprises a first relay valve control input 14 that is configured in a pneumatic manner and a second relay valve control input 17 that is configured in an electronic manner, relay valve working connections 15 and also a relay valve compressed air connection 16. The relay valve working connections 15 are connected via compressed air lines to the two wheel brakes 1, 2 of the front axle VA. The relay valve compressed air connection 16 connects the relay valve 13 to a first pressure storage container 20A for the first brake circuit A.

A relay valve control signal SA that is output by the first control unit 110 and that is transmitted via a first brake valve data line 32A may be transferred via the second relay control input 17 to the relay valve 13 for the electronic actuation. The electronic signal SA may be provided by way of example via a relay valve electronic system 150 that is arranged in the relay valve 13 and the valves that are arranged in the relay valve 13, by way of example 3/2 directional control valves, are actuated by means of said relay valve electronic system in order to generate a pressure that corresponds to the electronic signal SA.

A relay valve control pressure pA that is output by a bypass valve 21 is provided to the relay valve 13 via the first relay valve control input 14 for the pneumatic actuation, wherein the relay valve control pressure pA in accordance with this embodiment is predetermined in dependence upon a position of the bypass valve 21 either by an actuating device, by way of example a pneumatic brake valve 24a, in particular a foot brake valve, by means of a manual actuation of a brake pedal by the driver, or by means of a second control unit 120 that in particular electronically controls a parking brake valve 25.

The relay valve 13 outputs the braking pressures p1, p2 in a controlled manner to the wheel brakes 1, 2 of the front axle VA depending upon the prevailing relay valve control pressure pA at the first relay valve control input 14 or the prevailing relay valve control signal SA at the second relay valve control input 17, wherein the relay valve 13 outputs the compressed air in a controlled manner from the first pressure storage container 20A proportionally to the relay valve control pressure pA or in dependence upon the predetermined relay valve control signal SA to the wheel brakes 1, 2 of the front axle VA. Furthermore, the wheel brakes 1, 2 of the front axles VA may be vented via the relay valve 13 in order to reduce the pressure, by way of example via a relay valve venting connection 18, in dependence upon the relay valve control pressure pA or the relay valve control signal SA.

A redundancy function is integrated in the first control valve or in the relay valve 13 and it is possible using said redundancy function to automatically fall back from the electrical actuation via the relay valve control signal SA to a pneumatic actuation via the relay valve control pressure pA in the event of by way of example a defect or a failure being present in the electronic actuation by means of the first control unit 110.

It is preferred that a 2 channel axle modulator is provided for the second brake circuit B as a second control valve of the axle modulator 11, said 2 channel axle modulator pneumatically regulating the braking pressures p3, p4 independently of one another and outputting said braking pressures to the respective service brakes 3, 4. For this purpose, in a known manner, a pneumatic working pressure that is provided at an axle modulator compressed air connection 12a is output proportionally in a controlled manner at a corresponding level from a second pressure storage container 20B to axle modulator working connections 12c or 12b, wherein a first axle modulator working connection 12c is connected via compressed air lines to the right-hand side rear wheel brake 3 and a second axle modulator working connection 12b is connected to the left rear wheel brake 4. The corresponding braking pressure p3 or p4 may be reduced by means of a venting procedure via an axle modulator venting connection 12g.

The specification for increasing pressure, maintaining pressure or reducing pressure at the rear axle HA may be controlled by an axle modulator electronic system 130 that is integrated in the axle modulator 11, wherein the first control unit 110 for this purpose electronically predetermines an axle modulator control signal SB via a second brake valve data line 32B and a first axle modulator control input 12e, said axle modulator control signal determining the braking pressure p3, p4 that is to be output by the axle modulator 11 in a controlled manner, with the result that by way of example a vehicle desired deceleration zSoll that is predetermined by a third control unit 140 in an automated manner may be implemented or it is possible to react to an ABS brake slip.

As in the case in the first control valve or in the relay valve 13, a redundancy function is also integrated in the second control valve or in the axle modulator 11 and it is possible with said redundancy function to automatically fall back from the electrical actuation via the axle modulator control signal SB to a pneumatic actuation via a brake valve axle modulator control pressure pB1 that is prevailing at a second axle modulator control input 12f. The redundancy function may be used by way of example if a defect or a failure is discovered in the electronic actuation by means of the first control unit 110 or in the axle modulator electronic system 130 or during the transmission of the axle modulator control signal SB from the first control unit 110 to the axle modulator electronic system 130. The braking pressure p3, p4 is consequently no longer output in dependence upon the electrically predetermined axle modulator control signal SB but rather in dependence upon the brake valve axle modulator control pressure pB1 that is prevailing at the second axle modulator control input 12f and that is predetermined in accordance with this embodiment by the pneumatic brake valve 24a.

The pneumatic brake valve 24a outputs brake valve control pressures pA1, pB1 in a controlled manner proportionally to an actuating travel ds that is predetermined by the driver by means of actuating a brake pedal, wherein the actuation or the actuating travel ds by way of example may be converted in the first control unit 110 into a deceleration request that is described below as a driver deceleration zFahr. For the first brake circuit A, a brake valve relay valve control pressure pA1 is output in a controlled manner from the pneumatic brake valve 24a via a first compressed air line 22a to the bypass valve 21 and for the second brake circuit B the brake valve axle modulator control pressure pB1 is output in a controlled manner via a third compressed air line 22c to the axle modulator 11. The actuation by the driver may be transmitted via the relay valve control signal SA to the relay valve 13 in the form of the driver deceleration zFahr that is converted in the first control unit 110. The axle modulator 11 is electrically actuated corresponding to the driver deceleration zFahr that is transmitted via the axle modulator signal SB.

The electronically controlled parking brake valve 25 outputs parking brake valve control pressures pPB in a controlled manner to the third brake circuit C in dependence upon a request that is predetermined electronically via a parking brake signal S3, wherein for this purpose the parking brake valve control pressure pPB is output directly to the wheel brakes 3, 4 of the rear axle HA via a fourth and a fifth compressed air line 22d, 22e respectively. The request that is predetermined in an electronic manner is transmitted electronically via a parking brake data line 33 via the parking brake signal S3 from a second control unit 120. The second control unit 120 is preferably integrated in the parking brake valve 25 with the result that the transmission may also be omitted and the second control unit 120 directly assumes the control of the parking brake valve 25 in dependence upon the parking brake signal S3. This request may represent by way of example a parking brake specification fPB that is predetermined by a parking brake function 30 by the driver or in the redundancy case may be the vehicle desired deceleration zSoll that is transmitted from the third control unit 140 to the second control unit 120 with the result that the vehicle desired deceleration zSoll may also be implemented in the redundancy case at least in part by the parking brake valve 25 via the third brake circuit C.

In order to also be able to actuate the wheel brakes 1, 2 of the front axle VA in dependence upon the request that is predetermined by the second control unit 120, in particular by the vehicle desired deceleration zSoll that is predetermined in an automated manner, a bypass signal S4 that represents the vehicle desired deceleration zSoll is simultaneously transmitted electronically by said second control unit via a bypass signal line 26 to the bypass valve 21.

The relay valve control pressure pA for the relay valve 13 in the first brake circuit A may consequently be output in the redundancy case in accordance with the embodiment in FIG. 1 by said brake circuit to the bypass valve 21 that is allocated to the first brake circuit A as follows:

The bypass valve 21 is pneumatically connected via the first compressed air line 22a to the pneumatic brake valve 24a and electrically via the bypass signal line 26 to the second control unit 120 that controls the parking brake valve 25. The bypass valve 21 comprises a so-called select-high valve 21j and functions in such a manner that said bypass valve outputs a relay valve control pressure pA in a controlled manner, which implements either the via the electrical bypass signal S4 that transmits the vehicle desired deceleration zSoll, or via the pneumatic brake valve relay valve control pressure pA1 that is characterized by the driver deceleration zFahr that is requested.

Figure 5A:
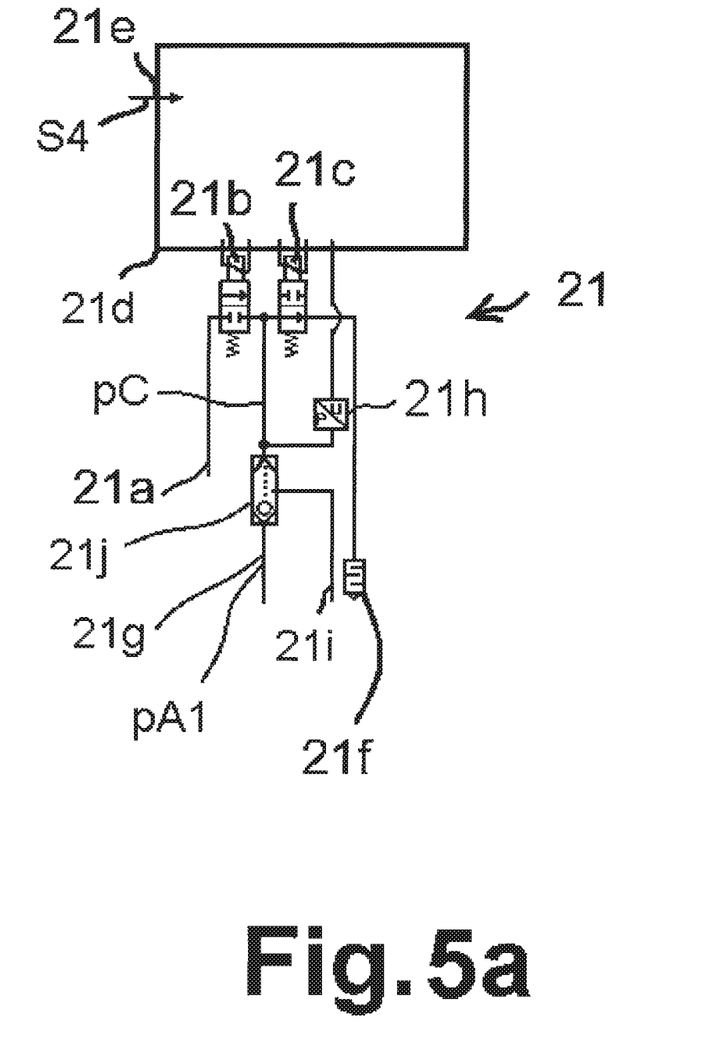
FIG. 5a illustrates one embodiment of a bypass valve.

The bypass valve 21 may be configured for this purpose as is illustrated in FIG. 5a. Accordingly, the bypass valve 21 comprises a bypass compressed air connection 21a via which the bypass valve 21 is connected to the first pressure storage container 20A for the first brake circuit A and furthermore may be supplied with compressed air.

An electrical actuation may take place via the bypass electronic system 21d in the bypass valve 21 using an inlet valve 21b and an outlet valve 21c, wherein, depending upon the prevailing bypass signal S4 and consequently the requested vehicle desired deceleration zSoll at a first bypass control input 21e, the inlet valve 21b is opened for a pressure increase or the outlet valve 21c is opened for a reduction in pressure or the two valves 21b, 21c are closed to maintain pressure. In the case of a reduction in pressure, a venting procedure is performed via a bypass venting connection 21f. A bypass control pressure pC is consequently set by means of the inlet valve 21b and the outlet valve 21c, said bypass control pressure being characterized by the level of the vehicle desired deceleration zSoll. The bypass valve 21 may be pneumatically actuated via a second bypass control input 21g via which the brake valve relay valve control pressure pA1 is received.

The bypass control pressure pC and also the brake valve relay valve control pressure pA1 are guided to a select-high valve 21j in the bypass valve 21 that only outputs the greater of the two control pressures pC, pA1. The select-high valve 21j is configured by way of example as a double non-return valve. The greater of the two control pressures pC, pA1 is subsequently relayed as a relay valve control pressure pA to a bypass output 21i that is connected to the relay valve 13.

In order to be able to transmit the relay valve control pressure pA or the brake valve relay valve control pressure pA1 via a shorter path, the bypass valve 21 may also be arranged directly in the relay valve 13 or alternatively in the pneumatic brake valve 24a.

The wheels 7, 8 of the rear axle HA may be braked via the wheel brakes 3, 4 by means of the parking brake valve 25 (third brake circuit C) in a controlled manner and/or may be braked by means of the pneumatic brake valve 24a (second brake circuit B) in a controlled manner, wherein a braking procedure is performed directly by means of the parking brake valve 25 and by means of the pneumatic brake valve 24a via the axle modulator 11. The wheel brakes 3, 4 of the rear axle HA may be configured for this purpose preferably as combined service and spring-type brake cylinders with the result that the wheels 7, 8 of the rear axle HA may be braked via the braking pressure p3, p4 that is output by the axle modulator 11 and/or may be braked via the parking brake valve control pressure pPB that is predetermined by the parking brake valve 25.

The pneumatic braking valve 24a is coupled to the pressure storage container 20A, 20B so as to provide the brake valve relay valve control pressure pA1 and the brake valve axle modulator control pressure pB1, said pressure storage container providing compressed air for the respective brake circuit A, B. The parking brake valve 25 is connected to a third pressure storage container 20C with the result that the parking brake valve control pressure pPB may be predetermined for the third brake circuit C. Furthermore, a trailer control valve 19 is provided that likewise is supplied with compressed air via the third pressure storage container 20C and is used to brake a trailer that is not illustrated here.

The control procedure of the electronic brake system 100 may take place as follows:

Since in accordance with FIG. 1 the system is an electronically controlled pneumatic brake system 100 (EBS brake system), the relay valve 13 and the axle modulator 11 are electrically actuated in the normal operation of the vehicle 200 by the first control unit 110 in that the relay valve control signal SA is transmitted electrically to the relay valve 13 via the second relay valve control input 17, said relay valve then outputting a corresponding braking pressure p1, p2 in a controlled manner to the wheel brakes 1, 2 of the front axle VA. The axle modulator control signal SB is transmitted electrically via the first axle modulator control input 12e to the axle modulator 11, said axle modulator control signal then setting the corresponding braking pressure p3, p4 at the wheel brakes 3, 4 of the rear axle HA in accordance with the above embodiments.

The relay valve control signal SA or the axle modulator control signal SB are preferably predetermined by the first control unit 110 via the first and second brake valve data line 32A, 32B. The first control unit 110 determines the control signals SA, SB herein either in dependence upon the vehicle desired deceleration zSoll that is predetermined by the third control unit 140, wherein the third control unit 140 is allocated to a controlled electronic regulating system that is configured so as to control the vehicle 200 in an automated manner or however in dependence upon the actuating travel ds that is predetermined by the pneumatic brake valve 24a by means of a manual actuation by the driver, said actuating travel being converted in the first control unit 110 into the driver deceleration zFahr. The first control unit 110 generates for this purpose the corresponding relay valve control signal SA for the first brake circuit A and the axle modulator control signal SB for the second brake circuit B from a first actuating signal S1A of the pneumatic brake valve 24a, said first actuating signal transmitting the actuating travel ds, and/or from a first request signal S2A of the third control unit 140, said first request signal transmitting the vehicle desired deceleration zSoll so as to initiate the corresponding deceleration zSoll, zFahr.

In the event of a failure of the electronic system, in other words for the case that the first actuating signal S1A and/or the first request signal S2A can no longer be received by the first control unit 110 or a relay valve control signal SA and/or axle modulator control signal SB cannot be output by the first control unit 110 or the relay valve control signal SA and/or the axle modulator control signal SB are incorrect and consequently the relay valve 13 and/or the axle modulator 11 can no longer be reliably actuated using electronic methods, the operation falls back to a fallback level in order to be able to nevertheless actuate the wheel brakes 1, 2, 3, 4.

For this purpose initially the relay valve 13 or the axle modulator 11 is only actuated pneumatically via the prevailing relay valve control pressure pA or the brake valve axle modulator control pressure pB1 in order to output the braking pressures p1, p2, p3, p4 to the wheel brakes 1, 2, 3, 4 in a controlled manner. Consequently, a switch is made for the actuation of the corresponding control valves 11, 13 from the electronic control inputs 17, 12e to the pneumatic control inputs 14, 12f of the respective control valve 11, 13. This occurs by way of example by means of corresponding spring-loaded redundancy valves in the corresponding control valve 11, 13 with the result that in the case of a failure of the electronic system it is possible to automatically mechanically switch from an electronic actuation to a pneumatic actuation.

The braking effect that is performed by means of the wheel brakes 1, 2, 3, 4 in the redundancy case is in particular dependent upon which fallback level or which redundant actuation the operation falls back to.

If the pneumatic brake valve 24a is not actuated in the redundancy case, the wheel brakes 1, 2, 3, 4 are thus actuated in a second electronic pneumatic fallback level merely in dependence upon the parking brake signal S3 that is generated by the second control unit 120 and also upon the bypass signal S4. For this purpose, the request signal S2 that transmits the vehicle desired deceleration zSoll is transmitted from the third control unit 140 via a second request signal S2B to the second control unit 120, said second control unit generating the parking brake signal S3 in dependence upon said second request signal and therefore controlling the parking brake valve 25. In addition, the bypass signal S4 is generated in dependence upon the vehicle desired deceleration zSoll in the second control unit 120 and is transmitted to the bypass valve 21. The second control unit 120 may ask the first control unit 110 via a monitoring signal S7 whether a failure or a defect is present in the electronic system and react accordingly thereto.

In the parking brake valve 25, the parking brake valve control pressure pPB is output via the fourth and the fifth compressed air line 22d, 22e to the wheel brakes 3, 4 of the rear axle HA in dependence upon the parking brake signal S3 and a braking procedure is consequently directly performed. In addition, the bypass signal S4 is transmitted to the bypass valve 21 via the bypass signal line 26. Since the pneumatic brake valve 24a is not actuated, the brake valve relay valve control pressure pA1 is approximately zero with the result that the bypass control pressure pC that is predetermined in dependence upon the vehicle desired deceleration zSoll is output in a controlled manner by the bypass valve 21 as a relay valve control pressure pA to the relay valve 13. As a result of which, the relay valve 13 will output in a controlled manner a braking pressure p1, p2 that is in proportion to the relay valve control pressure pA to the wheel brakes 1, 2 of the front axle VA in order to initiate the vehicle desired deceleration zSoll that is requested in an automated manner by the second control unit 120 or by the third control unit 140.

The first control unit 110 and the second control unit 120 may be operated electrically separately from one another, wherein a first electrical circuit 40A is provided for the first control unit 110 and a second electrical circuit 40B is provided for the second control unit 120. The first and also the second control unit 110, 120 may be supplied with energy via a first energy supply 41A and only the second control unit 120 is connected to a second energy supply 41B with the result that, in the event of an electronic defect in the first energy supply 41A, the second electrical circuit 40B having the second control unit 120 may continue to perform its functions in a redundant manner.

The third control unit 140 that in particular in the automated operation predetermines the vehicle desired deceleration zSoll via the first or the second request signal S2A, S2B for the first and the second control unit 110, 120, is connected both to the first as well as to the second energy supply 41A, 41B with the result that said third control unit in the case of a failure of the first electrical circuit 40A or in the case of a failure of the second electrical circuit 40B may be supplied with energy in the two cases. The respective data lines 32A, 32B, 33, 26 that are configured by way of example as a bus system, in particular a CAN bus, are arranged in the circuit 40A, 40B that is allocated to the respective control unit 110, 120 with the result that in the case of a defect a transmission of data is also ensured.

If the pneumatic brake valve 24a is simultaneously actuated in the redundancy case, by way of example by means of a mechanical actuation by the driver, by way of example in an emergency braking situation, or via an electronically controlled mechanical actuation of the brake pedal, it is crucial for the wheel brakes 1, 2 of the front axle VA whether the brake valve relay valve control pressure pA1 or the bypass control pressure pC is greater, said bypass control pressure being determined by means of the vehicle desired deceleration zSoll, in other words whether a greater deceleration zFahr, zSoll is predetermined by means of the actuation of the brake pedal or by means of the automated specification. In dependence thereupon, the braking pressure p1, p2 for the wheel brakes 1, 2 of the front axle VA is output in a controlled manner by means of the relay valve 13 in dependence upon the specification from the second control unit 120 or in dependence upon the specification of the pneumatic brake valve 24a.

In the case of an actuation of the pneumatic brake valve 24a, an actuation of the axle modulator 11 also occurs simultaneously and furthermore a braking pressure p3, p4 that is in proportion to said actuation is output to the wheel brakes 3, 4 of the rear axle HA. Furthermore, the parking brake valve 25 actuates the wheel brakes 3, 4 of the rear axle HA using a parking brake valve control pressure pPB that is dependent upon the vehicle desired deceleration zSoll with the result that depending upon the embodiment of the rear wheel brakes 3, 4, by way of example having combined service brake and spring-type brake cylinders, a braking force addition of the braking pressures p3 with pPB or p4 with pPB takes place at the respective wheel brakes 3, 4.

It is consequently possible in the case of a failure or a defect in the electronic system of the relay valve 13 and/or of the axle modulator 11 or of the signal connection, by way of example a CAN malfunction, from the or to the first control unit 110 to implement a vehicle desired deceleration zSoll that is predetermined electronically by the second or the third control unit 120, 140 in that the rear wheel brakes 3, 4 and the front wheel brakes 1, 2 may be actuated via the parking brake valve 25 or the bypass valve 21 in a controlled manner by the second control unit 120. If the driver predetermines an additional braking request in that he actuates the brake pedal by way of example in an emergency braking situation, the electronic braking request is overridden in accordance with this embodiment at least at the front axle VA, if this braking request is greater.

Figure 2:
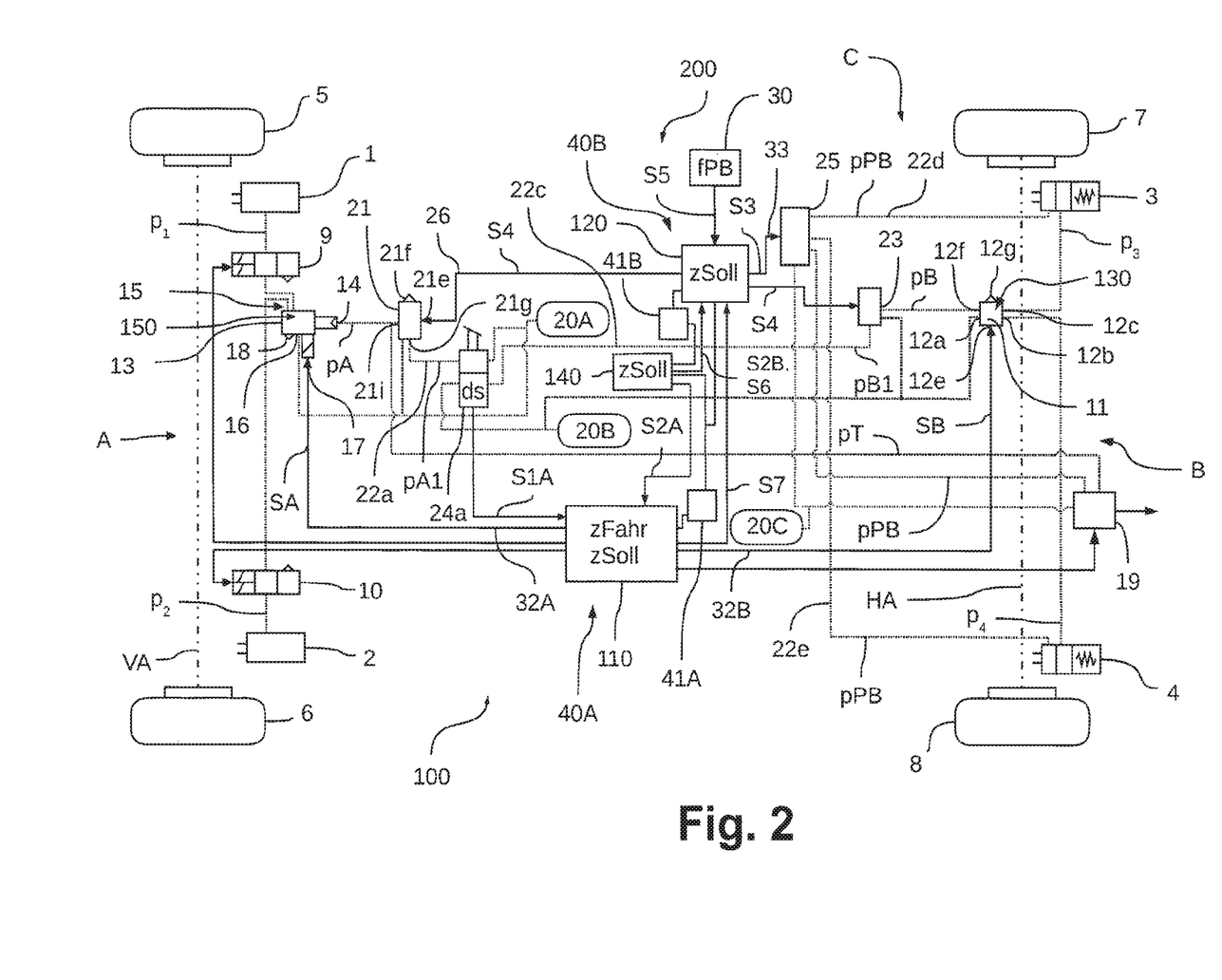
FIG. 2 illustrates a vehicle having an electronically controlled pneumatic brake system as a block diagram having two bypass valves.

In accordance with FIG. 2 in addition a second bypass valve 23 may be provided that functions in a similar manner to the first bypass valve 21. Accordingly, an axle modulator control pressure pB is predetermined at the axle modulator 11 by means of the second bypass valve 23, wherein the axle modulator control pressure pB is output in a controlled manner either in dependence upon the vehicle desired deceleration zSoll that is predetermined by the bypass signal S4 or in dependence upon the brake valve axle modulator control pressure pB1 depending upon which predetermines the greater deceleration request zSoll, zFahr. As a consequence, a vehicle desired deceleration zSoll that is predetermined by the second control unit 120 may also be output in a controlled manner via the axle modulator 11 to the rear wheel brakes 3, 4. As a consequence, the braking force distribution and also the braking effect may be further improved in the redundancy case.

Figure 3:
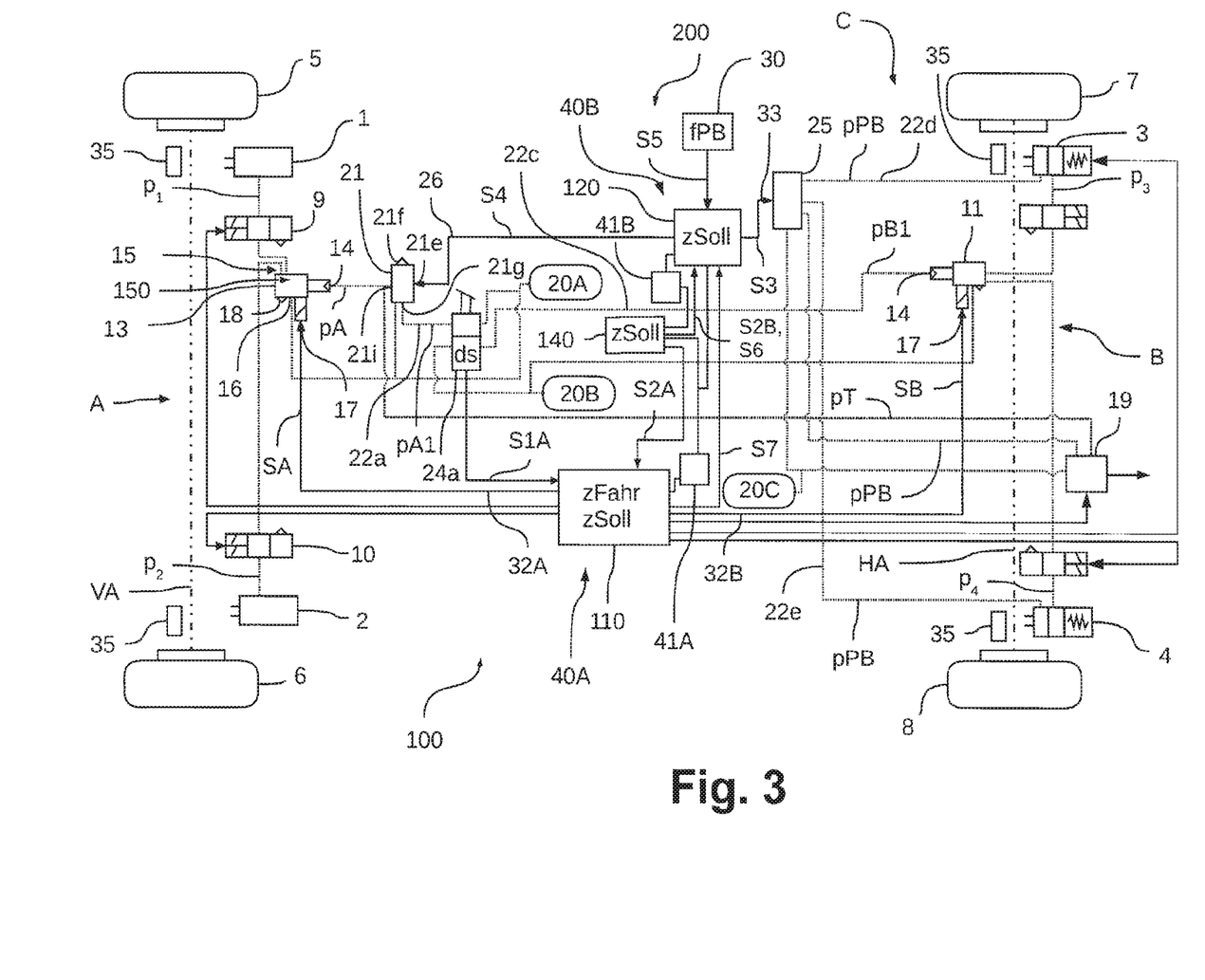
FIG. 3 illustrates a vehicle having an electronically controlled pneumatic brake system as a block diagram.

Alternatively, the brake system 100 may be configured as an electronically controlled pneumatic brake system 100, as illustrated in FIG. 3, said brake system comprising at the two vehicle axles VA, HA respectively ABS brake valves 9, 10 and also wheel rotational speed sensors 35 in order to be able to identify a brake slip at all four wheels 5, 6, 7, 8 and to be able to react to said brake slip. A braking pressure p1, p2, p3, p4 is provided via the control valves 11, 13 respectively at the wheel brakes 1, 2, 3, 4, wherein this braking pressure may be maintained or reduced by means of the ABS brake valves 9, 10 in dependence upon the wheel brake rotational speed sensors 35 in a case of an identified braking slip. The two control valves 11, 13 are configured in accordance with this embodiment as relay valves respectively having respectively a 3/2 directional control valve with the result that both an electronic actuation via the electronic relay valve control input 17 as well as a pneumatic actuation via the pneumatic relay valve control input 14 is rendered possible.

The pneumatic relay valve control input 14 is configured as a 3/2 directional control valve that permits a corresponding pressure to flow into the relay valve 11, 13 depending upon the control signal SA, SB that is present. If the control valves 11, 13 can no longer be actuated via the control signals SA, SB, a pneumatic control pressure pA and, where appropriate, pB is thus set at the pneumatic relay valve control input 14 corresponding to the brake system 100 in the FIGS. 1 and 2.

Figure 4:
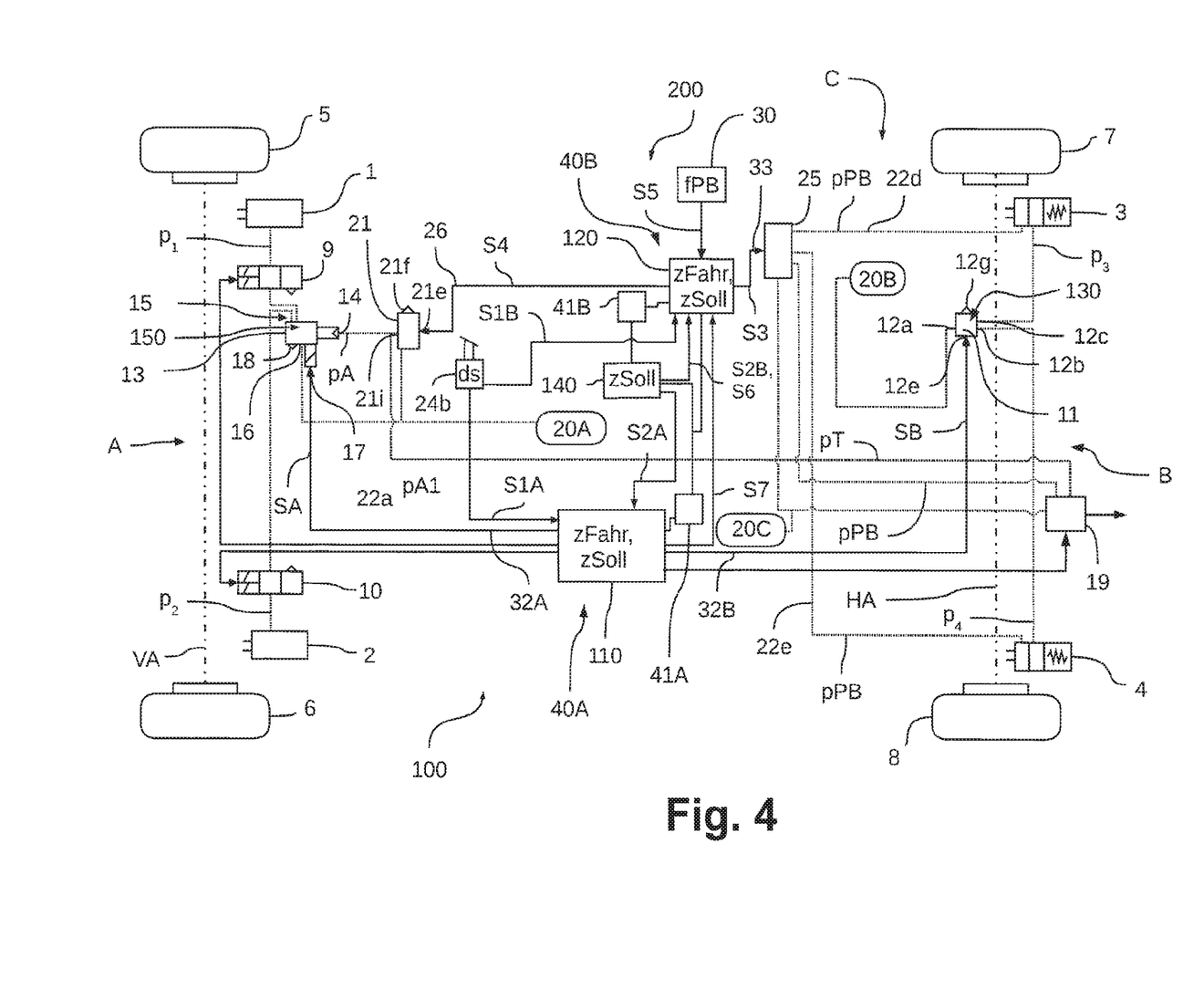
FIG. 4 illustrates a vehicle having a double electronically (2e) controlled pneumatic brake system as a block diagram.

In accordance with FIG. 4 in lieu of a pneumatic brake valve 24a an electrical actuating device 24b is provided as an actuating device that only generates electrical request signals S1A, S1B in dependence upon the actuating travel ds that is predetermined by means of the actuation of the brake pedal by the driver. The pneumatic procedure of outputting a control pressure in a controlled manner is consequently omitted in accordance with this embodiment by means of the actuating device 24b. The first request signal S1A is transmitted to the first control unit 110 that calculates from said first request signal the driver deceleration zFahr in order to predetermine via said driver deceleration the corresponding control signals SA, SB for the respective brake circuit A, B. The control valves 11, 13 are electrically actuated via said control signals.

In the event of a failure of the electronic system in the first control unit 110, in the redundancy case the braking request is predetermined in a redundant manner by means of the second control unit 120, wherein the specification is performed either in dependence upon the vehicle desired deceleration zSoll that is predetermined in an automated manner or in dependence upon the driver deceleration zFahr that results from the actuating travel ds and is calculated in the second control unit 120. The actuation or the actuating travel ds is transmitted via a second request signal S1B from the electrical actuating device 24b to the second control unit 120 and the driver deceleration zFahr is determined therefrom. The second control unit 120 then performs a check as to whether the driver deceleration zFahr or the vehicle desired deceleration zSoll is greater. The greater of the two decelerations zSoll, zFahr is transmitted electronically via the bypass signal S4 to the bypass valve 21 and via the parking brake signal S3 to the parking brake valve 25, said bypass valve and parking brake valve then outputting in a controlled manner a corresponding relay valve control pressure pA for the first brake circuit A or parking brake control pressure pPB for the third brake circuit C.

Figure 5B:
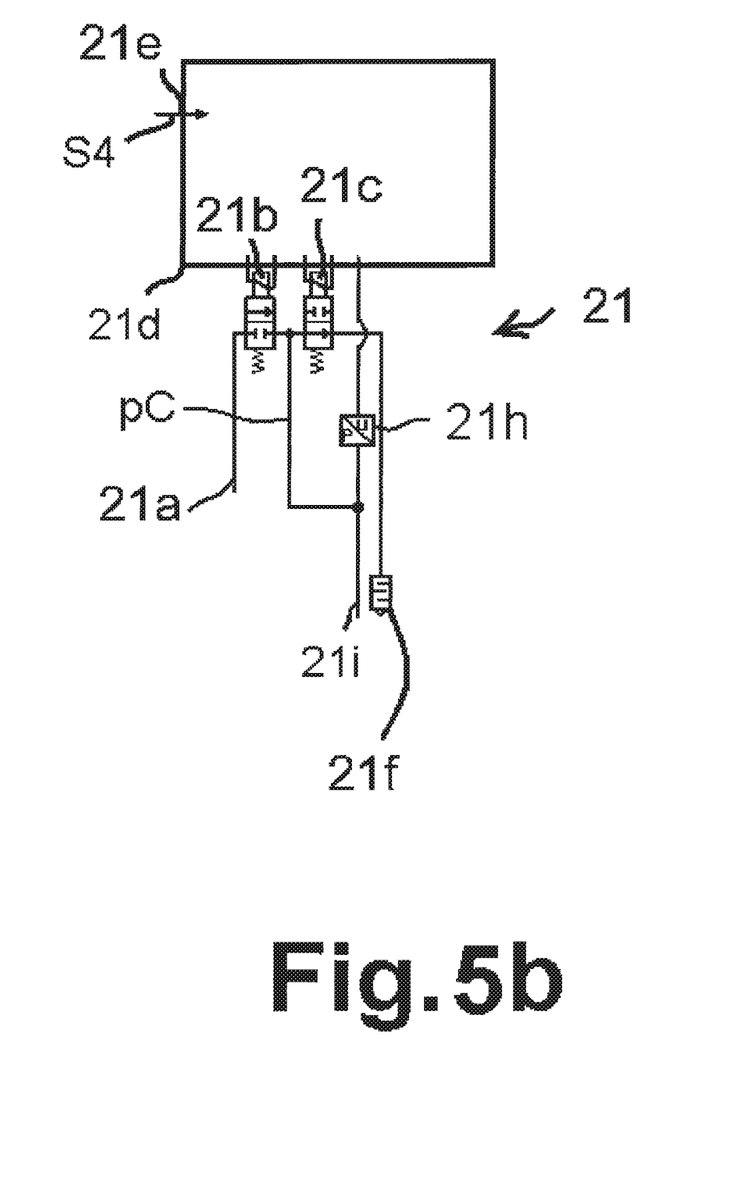
FIG. 5b illustrates an alternative embodiment of the bypass valve for use in a brake system in accordance with FIG. 4.

In accordance with FIG. 5b and in contrast to the embodiment in FIG. 5a, the bypass valve 21 for this embodiment does not comprise a select-high valve 21j since the procedure of deciding the greater deceleration zFahr, zSoll has already been performed in the second control unit 120. Furthermore, a pneumatic input 21g is not provided. Accordingly, only one inlet valve 21b and one outlet valve 21c are provided that generate in a controlled manner the bypass control pressure pC from the bypass electronic system 21d depending upon the bypass signal S4 that is prevailing, said bypass control pressure then being output as a relay valve control pressure pA to the bypass output 21*i*.

A double electronically controlled brake system is therefore proposed in FIG. 4, said brake system obtaining an electrical specification zSoll, ds from both the third control unit 140 for the automated operation as well as from the electrical actuating device 24*b*, said specification then being implemented in an electric pneumatic manner by means of the wheel brakes 1, 2, 3, 4.

Furthermore, in all the embodiments, a trailer control valve 19 is provided that may output a prevailing trailer control pressure pT in order to also be able to actuate wheel brakes of a trailer in the redundancy case. The trailer control pressure pT is predetermined by way of example by means of the relay valve control pressure pA that is output in a controlled manner in the first brake circuit A in the redundancy case.

If a redundancy case is not present, the trailer is actuated when at a standstill via the parking brake valve 25, wherein the actuation is predetermined in dependence upon the parking brake specification fPB by way of example by means of the driver activating a parking brake function 30 when at a standstill. In the event of the parking brake function 30 being activated when the vehicle 200 is at a standstill, the parking brake valve control pressure pPB is likewise supplied via the fourth and the fifth compressed air line 22*d*, 22*e* to the wheel brakes 3, 4 on the rear axle HA of the vehicle 200 with the result that a safe parking procedure of the vehicle 200 and also of the trailer may be ensured in a parking situation. The second control unit 120 in the case only outputs a braking request to the parking brake valve 25 with the result that the parking brake function that is predetermined by the driver is only initiated at the rear axle HA and also where appropriate at the trailer via the trailer control valve 19.

In addition, a parking brake function may also be implemented during the automated driving operation so as to park the vehicle 200 in that an automatic signal S6 is transmitted from the third control unit 140 to the second control unit 120 that then in particular via the parking brake valve 25 holding the vehicle 200 at a standstill and consequently being able to securing the vehicle 200 in an automated manner in a parking situation. The automated parking braking procedure may also be implemented using the wheel brakes 1, 2 of the front axle VA when the vehicle is at a standstill and without the presence of a redundancy case also by means of accordingly generating the bypass signal S4.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1, 2, 3, 4 Wheel brakes
5, 6, 7, 8 Wheels of the commercial vehicle 200
9, 10 ABS brake valves
11 Second control valve/axle modulator
12*a* Axle modulator compressed air connection
12*b*, 12*c* Axle modulator working connections
12*e* First axle modulator control input (electrical)
12*f* Second axle modulator control input (pneumatic)
12*g* Axle modulator venting connection
13 First control valve/relay valve
14 First relay valve control input (pneumatic)
15 Relay valve working connection
16 Relay valve compressed air connection
17 Second relay valve control input (electrical)
18 Relay valve venting connection
19 Trailer control valve
20A First pressure storage container
20B Second pressure storage container
20C Third pressure storage container
21 (First) bypass valve
21*a* Bypass compressed air connection
21*b* Inlet valve
21*c* Outlet valve
21*d* Bypass electronic system
21*e* First bypass control input
21*f* Bypass venting connection
21*g* Second bypass control input
21*h* Bypass pressure sensor
21*i* Bypass output
21*j* Select-high valve
22*a* First compressed air line
22*c* Third compressed air line
22*d* Fourth compressed air line
22*e* Fifth compressed air line
23 Second bypass valve
24*a* Pneumatic actuating device (brake valve)
24*b* Electric actuating device
25 Parking brake valve
26 Bypass signal line
30 Parking brake function (driver)
32A, 32B Control valve data line
33 Parking brake control line
35 Wheel rotational speed sensors
40A, 40B Electrical circuits
41A, 41B Energy supplies
100 Electrically controlled pneumatic brake system
110 First control unit
120 Second control unit
130 Axle modulator electronic system
140 Third control unit
150 Relay valve electronic system
200 Commercial vehicle
A First brake circuit
B Second brake circuit
C Third brake circuit (parking brake circuit)
ds Actuating travel fPB Parking braking procedure specification
HA Rear axle
p1, p2, p3, p4 Braking pressure at the wheel brakes 1, 2, 3, 4
pA Relay valve control pressure
pA1 Brake valve relay valve control pressure
pB Axle modulator control pressure
pB1 Brake valve axle modulator control pressure
pC Bypass control pressure
pPB Parking brake valve control pressure
pT Trailer control pressure
S1A First actuating signal (ds)
S1B Second actuating signal (ds)
S2A First request signal (zSoll)
S2B Second request signal (zSoll)
S3 Parking brake signal
S4 Bypass signal
S5 Driver signal
S6 Automatic signal
S7 Monitoring signal
SA Relay valve control signal
SB Axle modulator control signal
VA Front axle
zSoll Vehicle desired deceleration
zFahr Vehicle deceleration

The invention claimed is:

1. An electronically controllable pneumatic brake system, comprising:
a first brake circuit having an electrically and pneumatically controllable first control valve;
a second brake circuit having an electrically controllable parking brake valve;
a first control unit configured to electrically actuate the first control valve in dependence upon a vehicle desired deceleration that is requested in an automated manner or in dependence upon a driver-predetermined actuation via an actuating device;
a second control unit configured to electrically control the parking brake valve in dependence upon the vehicle desired deceleration that is requested in an automated manner, if an electrical actuation of the first control valve is prevented; and
a bypass valve allocated to the first control valve, the bypass valve being configured to pneumatically actuate the first control valve, wherein the pneumatic actuation is performed in dependence upon the vehicle desired deceleration, that is requested in an automated manner or in dependence upon the driver-predetermined actuation of the actuating device, if an electrical actuation of the first control valve is prevented.

2. The electronically controllable pneumatic brake system as claimed in claim 1, wherein the actuating device is a pneumatic brake valve configured to transmit, in dependence upon an actuating travel that is determined by an actuation of the brake valve by a driver, a brake valve control pressure to the bypass valve and a first actuating signal to the first control unit.

3. The electronically controllable pneumatic brake system as claimed in claim 2, wherein the pneumatic brake valve is pneumatically connected via a compressed air line to the bypass valve and the second control unit is electrically connected via a bypass signal line to the bypass valve,
wherein the compressed air line is configured to transmit the brake valve control pressure and the bypass signal line is configured to transmit a bypass signal that is provided by the second control unit and that transmits the vehicle desired deceleration to the bypass valve,
wherein the bypass valve is configured to generate a bypass control pressure that is dependent upon the vehicle desired deceleration that is transmitted via the bypass signal, and
wherein the bypass valve is configured to output, in a controlled manner a control pressure to the first control valve, the control pressure corresponding either to the brake valve control pressure or the bypass control pressure.

4. The electronically controllable pneumatic brake system as claimed in claim 3, wherein the bypass valve comprises a select-high valve configured to select the greater of the brake valve control pressure and the bypass control pressure.

5. The electronically controllable pneumatic brake system as claimed in claim 2, wherein the bypass valve is integrated in the pneumatic brake valve.

6. The electronically controllable pneumatic brake system as claimed in claim 1, wherein the actuating device is configured as an electrical actuating device that is configured to generate a first electrical actuating signal and a second electrical actuating signal in dependence upon an actuation by a driver, the actuation being predetermined by an actuating travel by the driver, wherein the electrical actuating device is configured to transmit the first actuating signal to the first control unit.

7. The electronically controllable pneumatic brake system as claimed in claim 6, wherein the electrical actuating device is connected to the second control unit and configured to electrically transmit the second actuating signal to the second control unit, wherein the second control unit is configured to convert the second actuating signal into a driver deceleration,
wherein the second control unit is electrically connected via a bypass signal line to the bypass valve that is allocated to the first control valve, the bypass signal line being configured to electrically transmit, to the bypass valve, the driver deceleration or the vehicle desired deceleration, and
wherein the bypass valve is configured to generate a bypass control pressure that is dependent upon the driver deceleration or the vehicle desired deceleration that is electrically transmitted via the bypass signal line and to output, in a controlled manner, the bypass control pressure as a control pressure to the first control valve.

8. The electronically controllable pneumatic brake system as claimed in claim 1, further comprising an additional brake circuit having an electrically and pneumatically controllable second control valve.

9. The electronically controllable pneumatic brake system as claimed in claim 8, further comprising a second bypass valve allocated to the second control valve, the second bypass valve being configured to pneumatically actuate the second control valve, wherein the pneumatic actuation of the second control valve is performed in dependence upon the vehicle desired deceleration.

10. The electronically controllable pneumatic brake system as claimed in claim 1, wherein the first control valve comprises an electrical control input for receiving an electrical control signal from the first control unit and a pneumatic control input for receiving a control pressure determined by the bypass valve, wherein first control valve is configured to output braking pressures in a controlled manner to the wheel brakes of the first brake circuit in dependence upon the electrical control signal or, if an electrical actuation of the first control valve is prevented, in dependence upon the control pressure determined by the bypass valve.

11. The electronically controllable pneumatic brake system as claimed in claim 1, wherein the bypass valve is integrated in the first control valve.

12. The electronically controllable pneumatic brake system as claimed in claim 1, wherein the brake system is configured as a three-circuit brake system, wherein the first brake circuit is configured to actuate wheel brakes of a front axle, wherein the second and the third brake circuits actuate wheel brakes of a driven rear axle, and wherein only one bypass valve is allocated to the first control valve.

13. The electronically controllable pneumatic brake system as claimed in claim 1, further comprising a second control valve configured as a relay valve or as an axle modulator.

14. The electronically controllable pneumatic brake system as claimed in claim 1, wherein the vehicle desired deceleration is predetermined in an automated manner by a third control unit, wherein the third control unit is configured so as to control the vehicle in an automated manner.

15. The electronically controllable pneumatic brake system as claimed in claim 1, wherein the second control unit is further configured to be actuated via a parking brake function, wherein the parking brake function is configured to be activated when the vehicle is at a standstill, and wherein, in the case of an activation, a parking brake valve control pressure is configured to be output in a controlled manner to wheel brakes of a third brake circuit of the vehicle, which brakes a rear axle so as to retain the vehicle in a parking position.

16. The electronically controllable pneumatic brake system as claimed in claim 1, further comprising a trailer control valve configured to be actuated via a trailer control pressure, wherein a control valve control pressure that is output by the bypass valve and that is supplied to a brake circuit may be output in a controlled manner as a trailer control pressure to the trailer control valve so as to provide a redundancy for a trailer.

17. The electronically controllable pneumatic brake system as claimed in claim 1, wherein the second control unit is allocated a second energy supply that is independent of the first control unit so as to electrically separate the control units.

18. A commercial vehicle having an electronically controlled pneumatic brake system as claimed in claim 1.

19. A method for electronically controlling a pneumatic brake system, the method comprising:
   identifying whether a failure or a defect in an electronic actuation of a first control valve of a first brake circuit has occurred;
   actuating a parking brake valve and at least one bypass valve by a control unit in response to the failure or the defect in the electronic actuation of the first control valve;
   outputting, by the parking brake valve, a parking brake valve control pressure to a further brake circuit; and
   performing a pneumatic actuation of the first control valve via the at least one bypass valve in dependence upon a vehicle desired deceleration that is requested in an automated manner or in dependence upon a driver-determined actuation of an actuating device.

* * * * *